US011010411B2

(12) United States Patent
Zhao et al.

(10) Patent No.: US 11,010,411 B2
(45) Date of Patent: May 18, 2021

(54) SYSTEM AND METHOD AUTOMATICALLY SORTING RANKED ITEMS AND GENERATING A VISUAL REPRESENTATION OF RANKED RESULTS

(71) Applicant: FUJI XEROX CO., LTD., Tokyo (JP)

(72) Inventors: Jian Zhao, Cupertino, CA (US); Francine Chen, Menlo Park, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 140 days.

(21) Appl. No.: 16/370,820

(22) Filed: Mar. 29, 2019

(65) Prior Publication Data

US 2020/0311106 A1 Oct. 1, 2020

(51) Int. Cl.
*G06F 16/28* (2019.01)
*G06F 16/9038* (2019.01)
*G06F 16/583* (2019.01)
*G06F 16/2457* (2019.01)

(52) U.S. Cl.
CPC ...... *G06F 16/285* (2019.01); *G06F 16/24578* (2019.01); *G06F 16/5838* (2019.01); *G06F 16/5854* (2019.01); *G06F 16/9038* (2019.01)

(58) Field of Classification Search
None
See application file for complete search history.

(56) References Cited

U.S. PATENT DOCUMENTS

| | | | |
|---|---|---|---|
| 8,214,764 B2 | 7/2012 | Gemmell et al. | |
| 2010/0199205 A1* | 8/2010 | Gemmell | G06F 16/9038 715/771 |
| 2013/0185294 A1* | 7/2013 | Kami | G06F 16/24578 707/732 |
| 2018/0018382 A1* | 1/2018 | Skodinis | G06F 16/289 |
| 2018/0032606 A1* | 2/2018 | Tolman | G06F 16/35 |
| 2018/0204632 A1* | 7/2018 | Kang | G06F 16/26 |

OTHER PUBLICATIONS

Ferragina, P. et al., A Personalized Search Engine Based on Web-Snippet Hierarchical Clustering, International World Wide Web Conference Committee (IW3C2), WWW 2005, May 10-14, 2005, Chiba, Japan, 10 pgs.

(Continued)

*Primary Examiner* — Son T Hoang

(74) *Attorney, Agent, or Firm* — Procopio, Cory, Hargreaves & Savitch LLP

(57) ABSTRACT

A method and system for visualizing data associated with a search inquiry. The method includes receiving, a data set each data item having associated rank information, and similarity information indicative of similarities between the data item and one or more other data items, sorting the data set into a ranked list based on the rank information, masking a contiguous portion of the ranked list based on a boundary parameter, iteratively clustering a portion of the ranked list other than the masked contiguous portion based op the similarity information to produce a clustered, ranked data list; and generating and displaying a visualization representative of the clustered, ranked data list, the visualization comprising a shaped object representative of each cluster in the clustered, ranked data list.

17 Claims, 7 Drawing Sheets

(4 of 7 Drawing Sheet(s) Filed in Color)

(56) References Cited

OTHER PUBLICATIONS

Zeng, H-J, et al., Learning to Cluster Web Search Results, In Proceedings of the 27th Annual International ACM SIGIR Conference on Research and Development in Information Retrieval, Jul. 25-29, 2004, Sheffield, South Yorkshire, UK, 8 pgs.

IBM Knowledge Center, Cluster Results, [online] retrieved Nov. 20, 2018, 2 pgs, URL: https://www.ibm.com/support/knowledgecenter/en/SS8NLW_9.0.0/com.ibm.swg.im.infosphere.dataexpl.engine.doc/c_functional-overview-clustering.html.

* cited by examiner

SYSTEM AND METHOD AUTOMATICALLY SORTING RANKED ITEMS AND GENERATING A VISUAL REPRESENTATION OF RANKED RESULTS

BACKGROUND

Field

The present disclosure relates to automatically sorting ranked items and generating a visual representation of ranked results, and more specifically, to systems and methods to Hierarchically Clustering Ranked Items for Effective Data Exploration.

Related Art

In related art systems data search result display and data visualization systems, hierarchical clustering is method for organizing data items that is sometimes used. Hierarchical clustering in these related art systems may produce a tree structure, which provides a summary that can be beneficial for users needing to understand and navigate a large dataset. More specifically, in related art systems the tree structure may be generated by progressively grouping similar items together, where leaf nodes represent original items and internal nodes (i.e., clusters) represent aggregated items. Related art approaches are either agglomerative (bottom-up) or divisive (top-down). With this hierarchy, a user of a related art system may be able to browse and summarize the entire dataset that is often large, in a multi-scale manner.

However, related art hierarchical clustering algorithms do not distinguish data items, which produce problems when hierarchical clustering is used for sequential or ranked data such as search results. For example in many real-world scenarios, data items may be presented in certain sequence or rank. For example, real-world scenarios involving data presented in a specific sequence or rank may include retrieved search results, recommendation lists for media to be played, and algorithm outputs with weights or probabilities (e.g., topical keywords in text corpus). Conversely, in related art hierarchical clustering algorithms, all data items are usually treated unordered and equal (e.g., ranking o sequencing is ignored).

While related art hierarchical clustering algorithms may help a user to view a dataset, when the data is ranked and large, ignoring the ranking information may result in less effective exploration. For example, one highly-weighted item could be located at a very deep level of the tree because of the grouping criteria, such that the user browsing the dataset may overlook this important (e.g., highly ranked) item simply because the user stops expanding the tree before that level or other miss the item because it is effectively buried within the clustered tree. Some related art systems may attempt to address this issue by selecting the most weighted item as the representative in a visual interface, but such related art systems may not resolve the issue because many internal nodes may be the same or similar when a highly-ranked item is in a very deep level.

SUMMARY OF THE DISCLOSURE

Aspects of the present application may include a method for visualizing data associated with a search inquiry. The method includes receiving, a data set each data item having associated rank information, and similarity information indicative of similarities between the data item and one or more other data items, sorting the data set into a ranked list based on the rank information, masking a contiguous portion of the ranked list based on a boundary parameter, iteratively clustering a portion of the ranked list other than the masked contiguous portion based on the similarity information to produce a clustered, ranked data list; and generating and displaying a visualization representative of the clustered, ranked data list, the visualization comprising a shaped object representative of each cluster in the clustered, ranked data list.

Additional aspects of the present application may include a non-transitory computer readable medium encoded with instructions for making a computing device execute a method of visualizing data associated with a search inquiry. The method includes receiving, a data set each data item having associated rank information, and similarity information indicative of similarities between the data item and one or more other data items, sorting the data set into a ranked list based on the rank information, masking a contiguous portion of the ranked list based on a boundary parameter, iteratively clustering a portion of the ranked list other than the masked contiguous portion based on the similarity information to produce a clustered, ranked data list; and generating and displaying a visualization representative of the clustered, ranked data list, the visualization comprising a shaped object representative of each cluster in the clustered, ranked data list.

Further aspects of the present application may include a computing device including memory storage device configured to store a database of data items, and a processor communicatively coupled to the memory storage device. The processor may be configured to receive a search query and perform a method of visualizing data associated with the search inquiry. The method includes receiving, a data set each data item having associated rank information, and similarity information indicative of similarities between the data item, and one or more other data items, sorting the data set into a ranked list based on the rank information, masking a contiguous portion of the ranked list based on a boundary parameter, iteratively clustering a portion of the ranked list other than the masked contiguous portion based on the similarity information to produce a clustered, ranked data list; and generating and displaying a visualization representative of the clustered, ranked data list, the visualization comprising a shaped object representative of each cluster in the clustered, ranked data list.

Further aspects of the present application may include a computing device including a means to store a database of data items, means to receive a search query, means to receive a data set each data item having associated rank information, and similarity information indicative of similarities between the data item and one or mote other data items, means for sorting the data set into a ranked list based on the rank information, means for masking a contiguous portion of the ranked list based on a boundary parameter, means for iteratively clustering a portion of the ranked list other than the masked contiguous portion based on the similarity information to produce a clustered, ranked data list; and means for generating and displaying a visualization representative of the clustered, ranked data list, the visualization comprising a shaped object representative of each cluster in the clustered, ranked data list.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
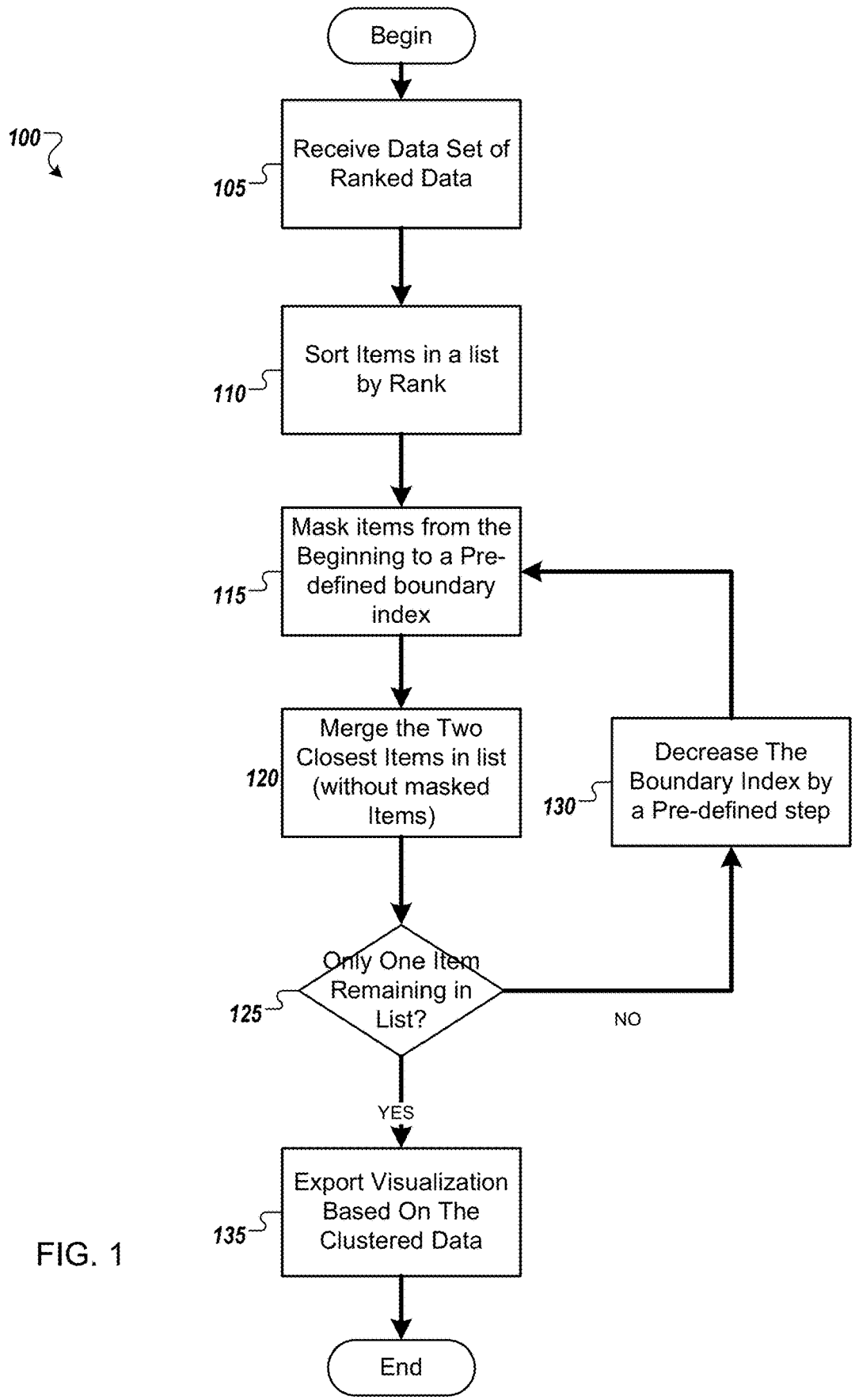
FIG. 1 illustrates a flow chart of a process of hierarchically clustering ranked items and exporting a visualization of the ranked items in accordance with example implementations of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application.

In the present application, the terms computer readable medium may include a local storage device, a cloud-based storage device, a remotely located server, or any other storage device that may be apparent to a person of ordinary skill in the art.

As described above, related art hierarchical clustering algorithms do not distinguish data items, which can produce problems when hierarchical clustering is used for sequential or ranked data such as search results. Specifically, in related art hierarchical clustering algorithms, all data items are usually treated unordered and equal (e.g., ranking or sequencing is ignored). While such related art hierarchical clustering algorithms may help a user to view a dataset, when the data is ranked and large, ignoring the ranking information may result in less effective exploration. For example, one highly-weighted item could be located at a very deep level of the tree because of the grouping criteria, such that the user browsing the dataset may overlook this important (e.g., highly ranked) item simply because the user stops expanding the tree before that level or other miss the item because it is effectively buried within the clustered tree.

In order to address this situation, example implementations of the present application may include a novel method, called Ranked Hierarchical Agglomerative Clustering, or RHAC, for hierarchically clustering data items by considering both similarity and rank when organizing structured data. These example implementations may allow highly-ranked or -weighted items to be placed higher in the hierarchy while at the same time preserving item clusters by similarity. For example, example implementations may promote highly-ranked or -weighted items in the hierarchy without letting many similar items be apart, (e.g., the integrity of clusters associated with weighted items may be preserved). This process may allow more important items to be seen earlier if a user explores the dataset according to the tree structure, for example, with tree visualization techniques.

Example implementations of the present application may be used to analyze and sort search results, arranging media to be displayed to a user, organizing documents in an electronic library of documents.

FIG. 1 illustrates flow chart of a process 100 of hierarchically clustering ranked items and exporting a visualization of the ranked items in accordance with example implementations of the present application. As described below, an aspect of some embodiments of the present application may involve excluding some of the mostly highly-ranked items from clustering at first, and then clustering, iteratively, the most related items that were not excluded. With each iteration, a percentage of the excluded items are re-included back into the clustering. By doing so, highly-ranked items will be included for merging consideration during hierarchical clustering, and thus they may be placed at a higher level in the hierarchy. The process may be performed by a computing device such as computing device 805 in the computing environment 800 illustrated in FIG. 8.

As illustrated in FIG. 1, the process 100 begins by the system receiving or identifying a data set containing ranked data information at 105. The ranked data information may be search results produced by an internet or web search engine, media files (e.g., songs, images, or videos), produced or associated with a media viewing platform (e.g., a streaming media service, an image library, or other media viewing platform), documents or papers stored in a electronic library or document storage platform, and predictive identifications or probabilities associated with outcomes of a predictive algorithm (such as a recognition algorithm).

After the data set is received, the data items are sorted into a list based on the ranking information associated with each item in the data set at 110. For example, all data items in the data set may be ranked based on their relevance to a user-provided search request. Items that are determined to have the most relevance to the search request are ranked highest, and items that are determined to have the least relevance to the search request are ranked the lowest. For purposes of explanation herein, the list may be denoted as L where $|L|=N$.

After the data items have been sorted into a list based on their ranking, the system may mask or exclude ranked items from the beginning of the list (e.g., the top of the list, or the items that have the highest rankings) from further analysis initially at 115. The masked or excluded ranked items may fall within specified boundary index of the top of the list. In other words, the system may mask items from the beginning (top) of list L to a boundary index b determined by a threshold t, where $b=|t \cdot N|$; $0<t<1$.

In some example implementations, the boundary index may be pre-defined by a system designer, system administrator, or user, or may be determined by the system automatically based on the received data set and an anticipated or desired tree depth. Further, in some example implementations, the boundary index may be dynamically determined by the system automatically, or may be dynamically adjusted by the user as feedback or a control of a produced visualization. In such an implementation, a visualization associated with the results of the clustering may be updated when the boundary index value adjusted. For example, a user may specify a new boundary index and the resulting visualization would be updating by reclustering again using the new boundary index.

For example, a user may adjust the boundary index downward to reduce the effect of the ranking on the clustering, or upward to increase the effect of the ranking on the clustering. In experimental implementations described herein the boundary index was set to be 40% (e.g., b=40% or the top 40% of ranked data was excluded or masked on initial iterations). As discussed below with respect to 130, b will gradually be reduced from $b_0=40$ to $b_{Final}=0$, as all excluded items are gradually added back into the clustering process.

After the beginning or top items of the list have been masked or excluded, the remaining unmasked items undergo one iteration of a hierarchical agglomerative clustering process at 120. From, the items in the list specified by L|b ... N|, the two closet items (or groups of items if previously merged) based on a similarity (or relatedness) metric. In some example implementations, the similarity may be based on one or more of authorship, subject matter, being volumes or parts of a larger whole, or any other clustering similarity that might be apparent to a person ordinary skill in the art.

At 125, a determination is made whether there is only a single item remaining in the list L. (e.g., the root of the tree). As may be apparent to a person of ordinary skill in the art, there can be only a single item in the list (e.g., the root of the tree) when all items in the list have been included (e.g., unmasked) in the clustering process (e.g., $b_{Final}=0$).

If there are more than one item remaining in the list (NO at 125), the process 100 continues to 130, and boundary index b is deceased or reduced by a specified amount or step s, such that the value b at any subsequent iteration t may be defined as $b_t=b_{t-1}-|s \cdot N|$, $0<s<1$, where s is a step parameter. This lowers the boundary index b, so more data items of the original list for the consideration of merging during a clustering process.

In some example implementations, the step parameter may be pre-defined by a system designer, system administrator, or user, or may be determined by the system automatically based on the received data set and an anticipated or desired tree depth. Further, in some example implementations, the step parameter may be dynamically determined by the system automatically, or may be dynamically adjust by the user as feedback or a control of a produced visualization. In such an implementation, a visualization associated with the results of the clustering may be updated when the step parameter value adjusted. For example, a user may specify a new step parameter and the resulting visualization would be updating by re-clustering again using the new step parameter.

For example, a user may adjust the step parameter upward to reduce the effect of the ranking on the clustering, or downward to increase the effect of the ranking on the clustering. In experimental implementations described herein the step parameter was set to be 1% (e.g., s=1% or lowest 1% of excluded or masked rank ranked data is included in the clustering during subsequent iterations).

Once the boundary index has been reduced, the process 100 of FIG. 1 returns to 115 and the items in the ranked list are masked based on the newly reduced boundary index b calculated at 130, 115, 120, and 125, are repeated until only a single item remains in the ranked list L (e.g., the root of the tree) and b=0 (e.g., List L includes all the items).

Once the ranked list L has been reduced to a single item and all items have been included in the list L (e.g., Yes at 125), the process 100 moves to 135 where a visualization based the ranked and clustered list L is exported or displayed to a user to allow interactive exploration of the data. An example implementation of a visualization based on the ranked and clustered list L r provided in FIG. 4 below.

In some example implementations, the process 100 may also be configured to exit at 125 prior to the ranked list L being reduced to a single item. For example, an early stoppage at 125 may be trigged by another or additional stopping criteria. For example, 125 may be stopped by reaching a desired number of clusters, and thus a cluster count determination could also be tested as part of the stopping conditions of 125 (e.g., by an OR of the two conditions could be used). Other stoppage conditions may be apparent to a person of ordinary skill in the art.

After the visualization has been exported or displayed, the process 100 may end in some example implementations. In other example implementations, the process 100 may be repeated if a user updates or changes either the boundary index value, the step parameter, or both.

Figure 2:
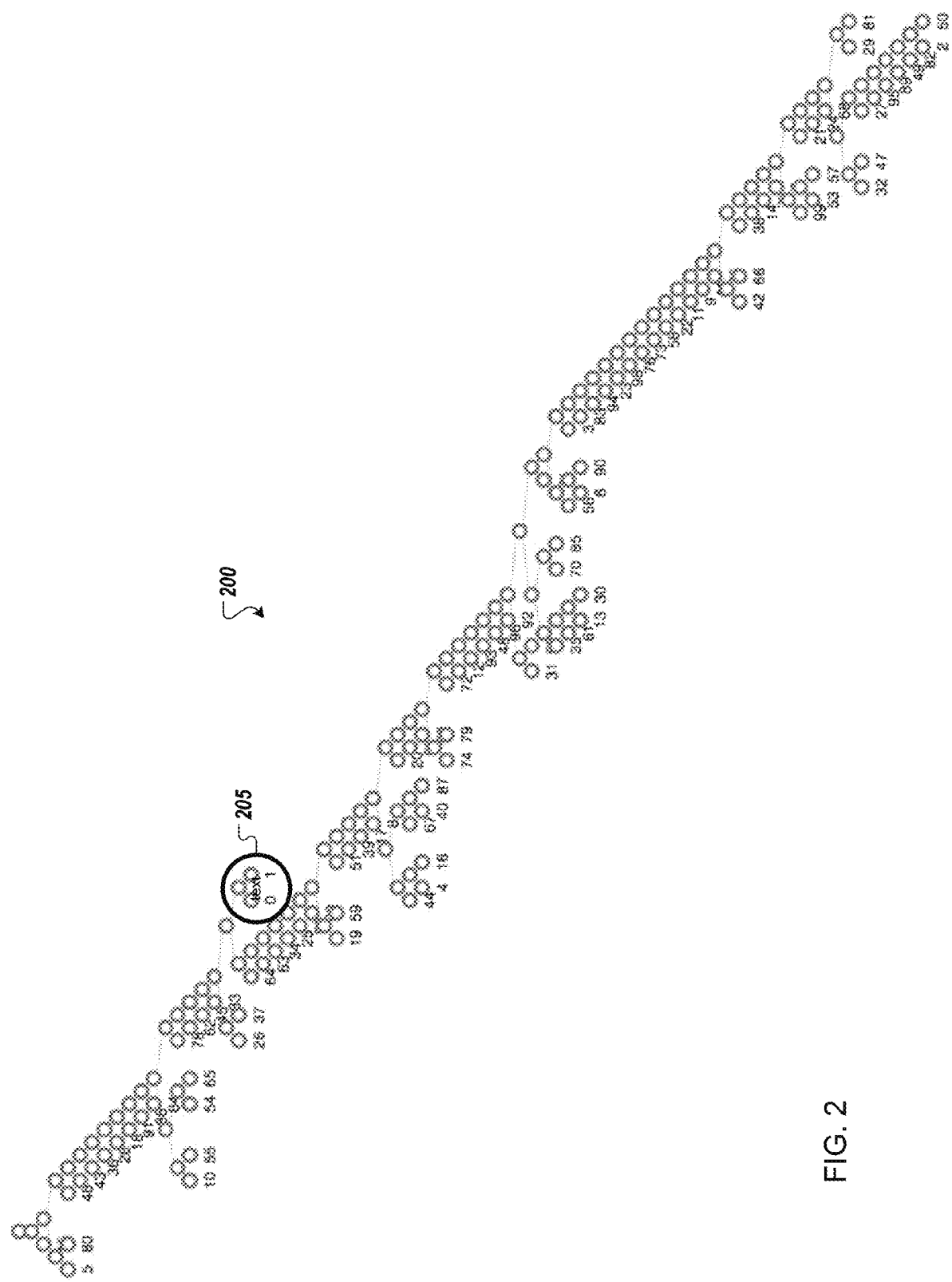
FIG. 2 illustrates a data tree produced by a Hierarchically Agglomerative Clustering (HAC) algorithm in accordance with a comparative example.
Figure 3:
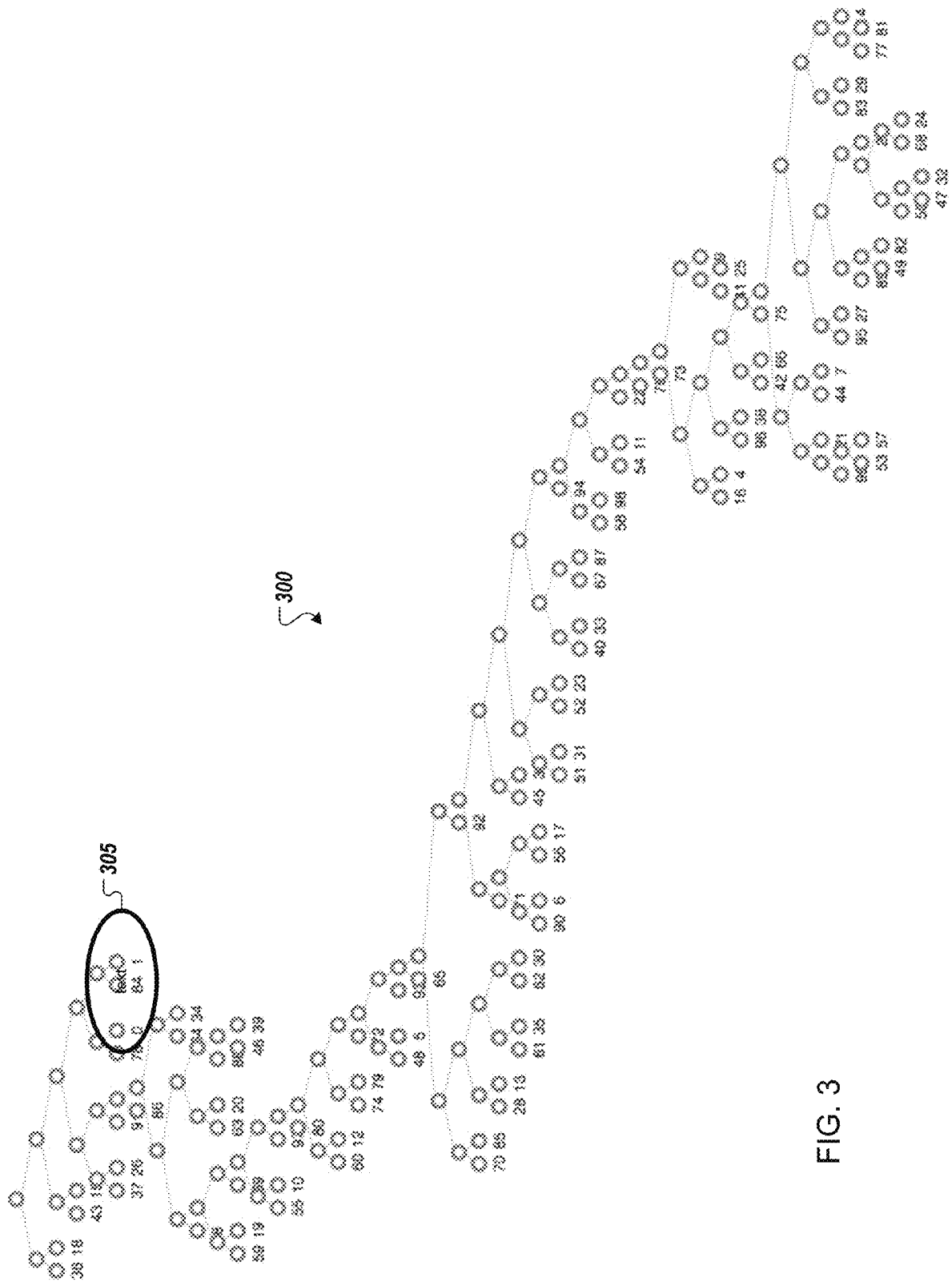
FIG. 3 illustrates a data tree produced by a Ranked Hierarchically Agglomerative Clustering (RHAC) in accordance with an example implementation of the present application.

FIG. 2 illustrates a data tree 200 produced by a Hierarchically Agglomerative Clustering (HAC) algorithm in accordance with a comparative example. Further, FIG. 3 illustrates a data tree 300 produced by a Ranked Hierarchically Agglomerative Clustering (RHAC) in accordance with an example implementation of the present application. FIGS. 2 and 3 illustrate the results of a HAC algorithm similar to the related art and a RHAC algorithm in accordance with an example implementation using a dataset containing 100 documents. The distance metric between documents used in clustering in generating these figures was the cosine similarity based on a bags-of-word model. Single linkages were employed to compute the cluster distance.

As a comparison between FIGS. 2 and 3 might illustrate that the RHAC algorithm, which was used to produce the data tree 300 of FIG. 3, produce a more balanced tree. Additionally, items with higher ranks (e.g., more relevant to an inquiry are placed higher in the tree in the data tree 300 produced by the RHAC algorithm according to example implementations of the present application. For example, nodes with rank #0 and #1 appear on the $6^{th}$ level in RHAC highlighted by the oval 305 illustrated in FIG. 3. Conversely, the same notes on the $18^{th}$ level in the traditional HAC as highlighted by the oval 205 illustrated in FIG. 2.

As these two, highly ranked data items may be important to be viewed, but a user must to zoom really deep (18 levels) to locate them using the hierarchy in FIG. 2, compared to the much shallower level (6 levels) illustrated in FIG. 3, significantly decreasing the opportunity to visit them for the visual exploration of data in real-world applications. For a larger dataset, this problem may become exacerbated.

TABLE 1

Comparison of coherence of the clusters in HAC and RHAC.
The quantities of each measure are shown in mean (std.)

| method | mean of item distances | std. of item distances | diameter |
|---|---|---|---|
| HAC | 0.960 (0.04) | 0.040 (0.02) | 0.979 (0.05) |
| RHAC | 0.941 (0.05) | 0.030 (0.02) | 0.955 (0.06) |

Further, Applicant's further investigated the quality of clusters. For each cluster (e.g., represented by an internal node) at each level of the tree, that contains the leaf nodes of that internal node, several metrics were computed about the cluster, including the mean of the pairwise distances between member documents, the standard derivation of these distances, and the diameter of the cluster (i.e., the maximum distance). Table 1 (above) illustrates the statistics of all the clusters for these metrics.

A person of ordinary skill in the art might assume that by introducing the masking of the most highly ranked elements effectiveness of the clustering is being impeded, which might naturally be assumed to reduce the overall coherence of the clustering process. However, as can be observed from Table 1, the RHAC algorithm of example implementations of the present application does not only produce coherence values that are on par with related HAC algorithms, but actually produced better coherence values (e.g., small values for the RHAC algorithm. This indicates that RHAC does not decrease the quality of clusters compared to the original HAC.

Figure 4:
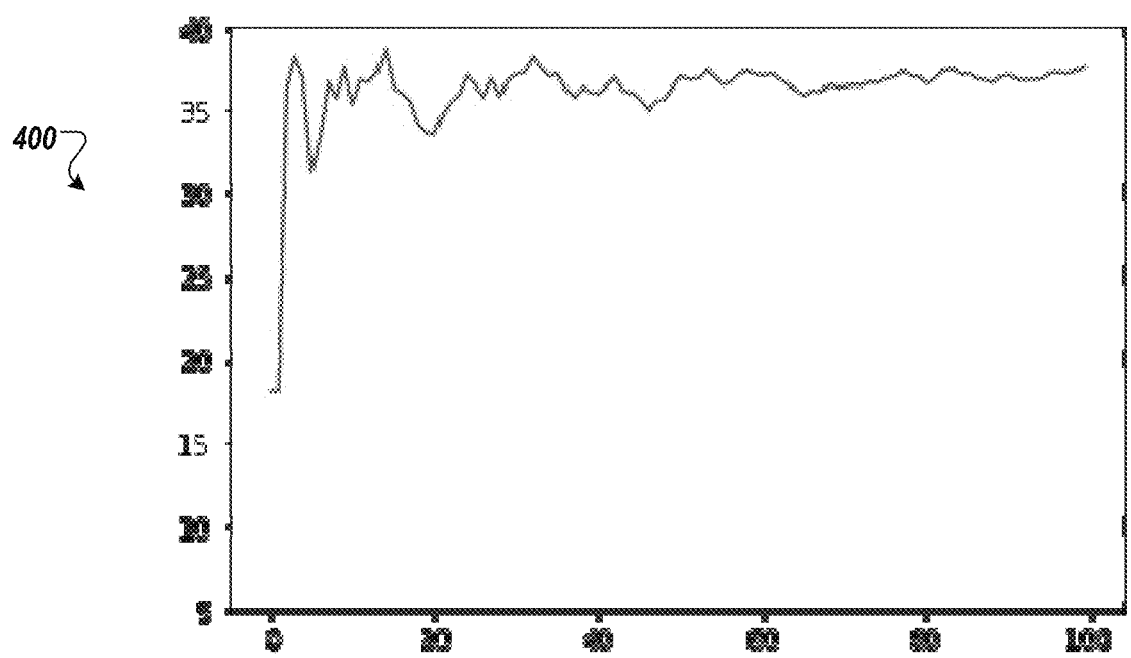
FIG. 4 illustrates a graphical plot of average path lengths for accessing the top N documents in the data tree of FIG. 2 in accordance with a comparative example demonstrating the related art.
Figure 5:
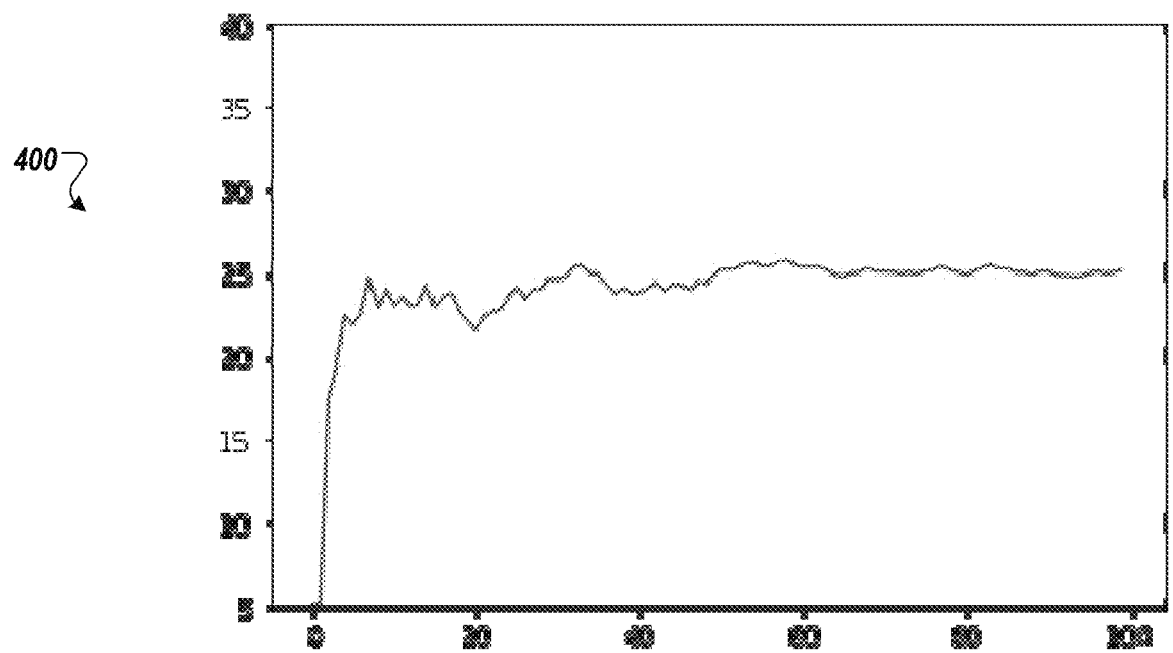
FIG. 5 illustrates a graphical plot of average path lengths for accessing the top N documents in the data tree of FIG. 3 in accordance with an example implementation of the present application.

FIG. 4 illustrates a graphical plot 400 of average path lengths for accessing the top N documents in the data tree of FIG. 2 in accordance with a comparative example demonstrating the related art. FIG. 5 illustrates a graphical plot 500 of average path lengths for accessing the top N documents in the data tree of FIG. 3 in accordance with an example implementation of the present application.

Further, the calculated average length of paths accessing for the documents with rank less than N for the two resulting hierarchies (FIGS. 2 and 3) was also calculated. As FIGS. 5 and 6 illustrates, for N=25, the average length for the HAC (related art algorithm) is 37.16 and for the RHAC (example implementation of present application) is 23.68, which means a user could spend much less effort in accessing the top ranked documents in the dataset.

Further, FIGS. 4 and 5 shows the comparison of this measure for these two methods for every N. As a comparison between FIGS. 4 and 5 illustrate, that RHAC produces much less average path lengths, and thus is more effective for the visual exploration of the dataset with the hierarchy.

Figure 6:
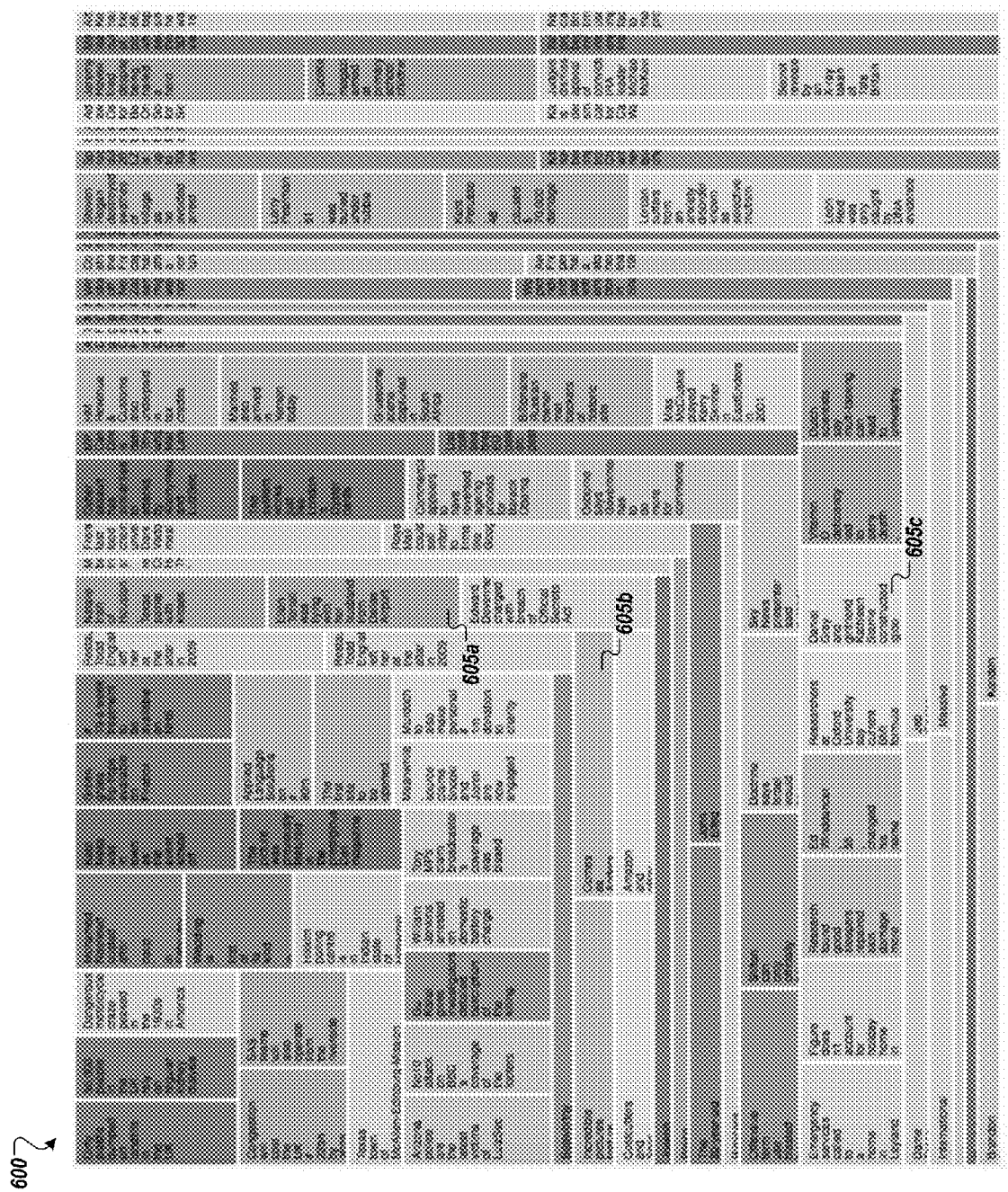
FIG. 6 is a representation of a User Interface produced using a process in accordance with example implementations.

FIG. 6 is a representation of a User Interface 600 produced using a process in accordance with example implementations. The User Interface 600 illustrates a multi-scale data tree map produced using a clustered hierarchy of ranked data generated by a RHAC algorithm in accordance with example implementations of the present application. The visualization may be transmitted by a communication device or displayed on a display device associated with a computing device such as computing device 805 of the computing environment 800 illustrated in FIG. 8 below. For example, the User Interface 600 may be displayed on a display such as a computer screen or touch display of a portable computing device.

As described above with respect to 135 of process 100 of FIG. 1, Based on the results of the hierarchical clustering of data, a visualization may be produced, exported or displayed. For example, a multi-scale visualization can be built using a zoom able tree map.

In the User Interface 600, each rectangle or square (e.g., 605a, 605b, 605c) may correspond to a separate cluster produced by the RHAC algorithm. Further, in some example implementations, the size of each square or rectangle (e.g., 605a, 605b. 605c) may be representative of the size of the associated cluster. For example a taller square or rectangle 605a may correspond to a cluster having more internal levels then the cluster associated with a shorter square or rectangle 605b. Further, a wider square or rectangle 605b may correspond to a cluster having wider levels (e.g., more parallel, sub-clusters) than the cluster associated with a narrower square or rectangle 605c.

Further, in some example implementations another aspect of the squares or rectangles of the UI 600 may correspond to priority in the ranking (e.g., clusters containing more highly ranked data entries). For example color of the squares or rectangles of the UI 600 may correspond to the priority in the ranking.

FIG. 6 illustrates a tree map visualization of a collection of documents. In an example implementation, text analysis techniques may be used to generate summaries of documents in each cluster at different levels. For example, a user may want to explore these documents that are retrieved from a query of the database. Then, the user may leverage the text summaries and the hierarchy to browse this large collection of results. As RHAC promotes the top ranked documents in the search results, the user may gain an overview of the data without losing the benefits provided by the search. Thus, the user can more easily visualize both the items that have the highest ranks (e.g., most relevance to a search) while also visualizing the largest clusters associated with a topic or document. Initially, only documents until certain level in the hierarchy are shown in the visualization, and the user can get a basic understanding of the data. Later, the user may further explore one or more regions of interest through the data tree map through an interface such as 600 of FIG. 6, to zoom into that part of the hierarchy.

Figure 7:
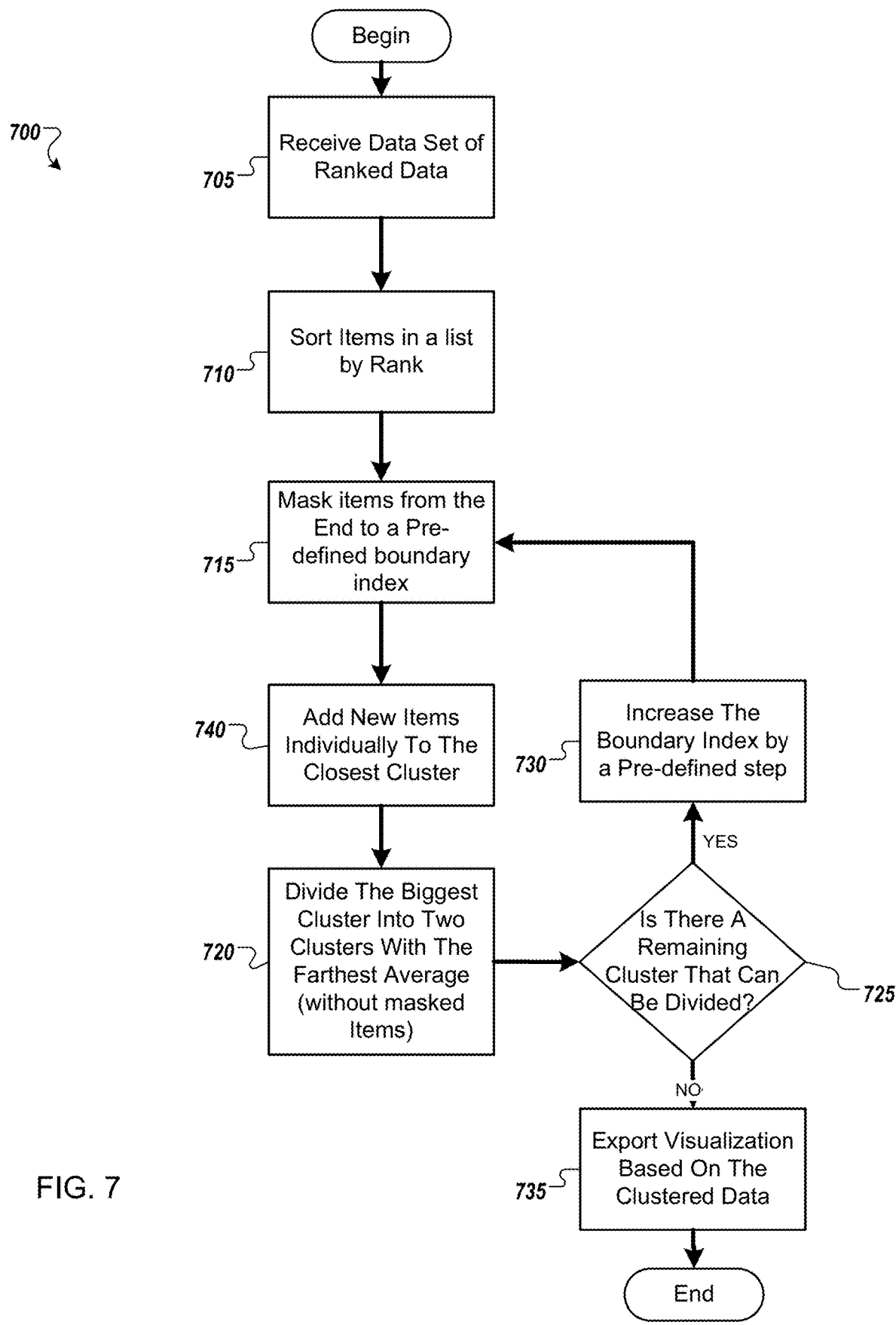
FIG. 7 illustrates flow chart of a process of hierarchically clustering ranked items and exporting a visualization of the ranked items in accordance with other example implementations of the present application.

FIG. 7 illustrates flow chart of a process 700 of hierarchically clustering ranked items and exporting a visualization of the ranked items in accordance with other example implementations of the present application. As described below, an aspect of some embodiments of the present application may involve excluding some of the mostly lowly-ranked items from clustering at first, and then clustering, iteratively, the most related items that were not excluded. With each iteration, a percentage of the excluded items are re-included back into the clustering. By doing so, lowly-ranked items will be included for consideration during hierarchical clustering, and thus they may be placed at a lower level in the hierarchy. The process may be performed by a computing device such as computing device 805 in the computing environment 800 illustrated in FIG. 8.

As illustrated in FIG. 7, the process 700 begins by the system receiving or identifying a data set containing ranked data information at 705. The ranked data information may be search results produced by an internet or web search engine, media files (e.g., songs, images, or videos), produced or associated with a media viewing platform (e.g., a streaming media service, an image library, or other media viewing platform), documents or papers stored in a electronic library or document storage platform, and predictive identifications or probabilities associated with outcomes of a predictive algorithm (such as a recognition algorithm).

After the data set is received, the data items are sorted into a list based on the ranking information associated with each item in the data set at 710. For example, all data items in the data set may be ranked based on their relevance to a user-provided search request. Items that are determined to have the most relevance to the search request are ranked highest, and items that are determined to have the least relevance to the search request are ranked the lowest. For purposes of explanation herein, the list may be denoted as L where $|L|=N$.

After the data items have been sorted into a list based on their ranking, the system may mask or exclude ranked items from the end of the list (e.g., the bottom of the list, or the items that have the lowest rankings) from further analysis initially at 715. The masked or excluded ranked items may fall within specified boundary index of the bottom of the list. In other words, the system may mask items from the end (bottom) of list L to a boundary index b determined by a threshold t, where $b=|t \cdot N|$; $0<t<1$.

In some example implementations, the boundary index may be pre-defined by a system designer, system administrator, or user, or may be determined by the system automatically based on the received data set and an anticipated or desired tree depth. Further, in some example implementations, the boundary index may be dynamically determined by the system automatically, or may be dynamically adjusted by the user as feedback or a control of a produced visualization. In such an implementation, a visualization associated with the results of the clustering may be updated when the boundary index value adjusted. For example, a user may specify a new boundary index and the resulting visualization would be updating by reclustering again using the new boundary index.

For example, a user may adjust the boundary index downward to reduce the effect of the ranking on the clustering, or upward to increase the effect of the ranking the clustering. In experimental implementations described herein the boundary index was set to be 40% (e.g., b=40% or the bottom 40% of ranked data was excluded or masked on initial iterations). As discussed below with respect to 730, b will gradually be reduced from $b_0=40$ to $b_{Final}=0$, as all excluded items are gradually added back into the clustering process.

At 740, if any items have been newly unmasked in the iterative process 700, the newly non-masked items are clustered around any existing cluster based on similarities to one or more separated items.

At 720, one iteration of a hierarchical decisive clustering process is performed on the unmasked items. From the items in the list specified by $L|1 \ldots b|$, the largest cluster (or groups of items if previously merged) are divided or separated into two clusters with the farthest average similarity, based on a similarity (or relatedness) metric. In some example implementations, the similarity may be based on one or more of authorship, subject matter, being volumes or parts of a larger whole, or any other clustering similarity that might be apparent to a person ordinary skill in the art. Thus, the least related items are separated or divided to define separate branches.

At 725, a determination is made whether there is any cluster remaining that can be divided in the list L (e.g., are further branches of the tree or leaves of tree possible). As may be apparent to a person of ordinary skill in the art, there can be only a single item in the list (e.g., the root of the tree) when all items in the list have been included (e.g., unmasked) in the clustering process (e.g., $b_{Final}=0$).

If there are is a remaining cluster suitable for division in the list (YES at 725), the process 700 continues to 730, and boundary index b is increased by a specified amount or step s, such that the value b at any subsequent iteration t may be defined as $b_t=b_{t-1}+|s \cdot N|$, $0<s<1$, where s is a step parameter. This raises the boundary index b, so more data items of the original list for the consideration of merging during a clustering process.

In some example implementations, the step parameter may be pre-defined by a system designer, system administrator, or user, or may be determined by the system automatically based on the received data set and an anticipated or desired tree depth. Further, in some example implementations, the step parameter may be dynamically determined by the system automatically, or may be dynamically adjust by the user as feedback or a control of a produced visualization. In such an implementation, a visualization associated with the results of the clustering may be updated when the step parameter value adjusted. For example, a user may specify a new step parameter and the resulting visualization would be updating by re-clustering again using the new step parameter.

For example, a user may adjust the step parameter upward to reduce the effect of the ranking on the clustering, or downward to increase the effect of the ranking on the clustering. In experimental implementations described herein the step parameter was set to be 1% (e.g., s=1% or lowest 1% of excluded or masked rank ranked data is included in the clustering during subsequent iterations).

Once the boundary index has been increased, the process 700 of FIG. 7 returns to 715 and the items in the ranked list are masked based on the newly increased boundary index b calculated at 730. 715, 740, 720, and 725, are repeated until no further clusters are suitable for division in the ranked list L (e.g., further branches possible in the tree) and b=0 (e.g., List L includes all the items).

Once the ranked list L has identified a single cluster not suitable for further division and all items have been included in the list L (e.g., no at 725), the process 700 moves to 735 where a visualization based the ranked and clustered list L is exported or displayed to a user to allow interactive exploration of the data. An example implementation of a visualization based on the ranked and clustered list L is provided in FIG. 4 above.

In some example implementations, the process 700 may also be configured to exit at 725 prior to the ranked list L has identified a single cluster not suitable for further division. For example, an early stoppage at 725 may be trigged by another or additional stopping criteria. For example, 725 may be stopped by reaching a desired number of clusters, and thus a cluster count determination could also be tested as part of the stopping conditions of 725 (e.g., by an OR of the two conditions could be used). Other stoppage conditions may be apparent to a person of ordinary skill in the art.

Alter the visualization has been exported or displayed, the process 700 may end in some example implementations. In other example implementations, the process 700 may be repeated if a user updates or changes the boundary index value, the step parameter, or both.

Example Computing Environment

Figure 8:
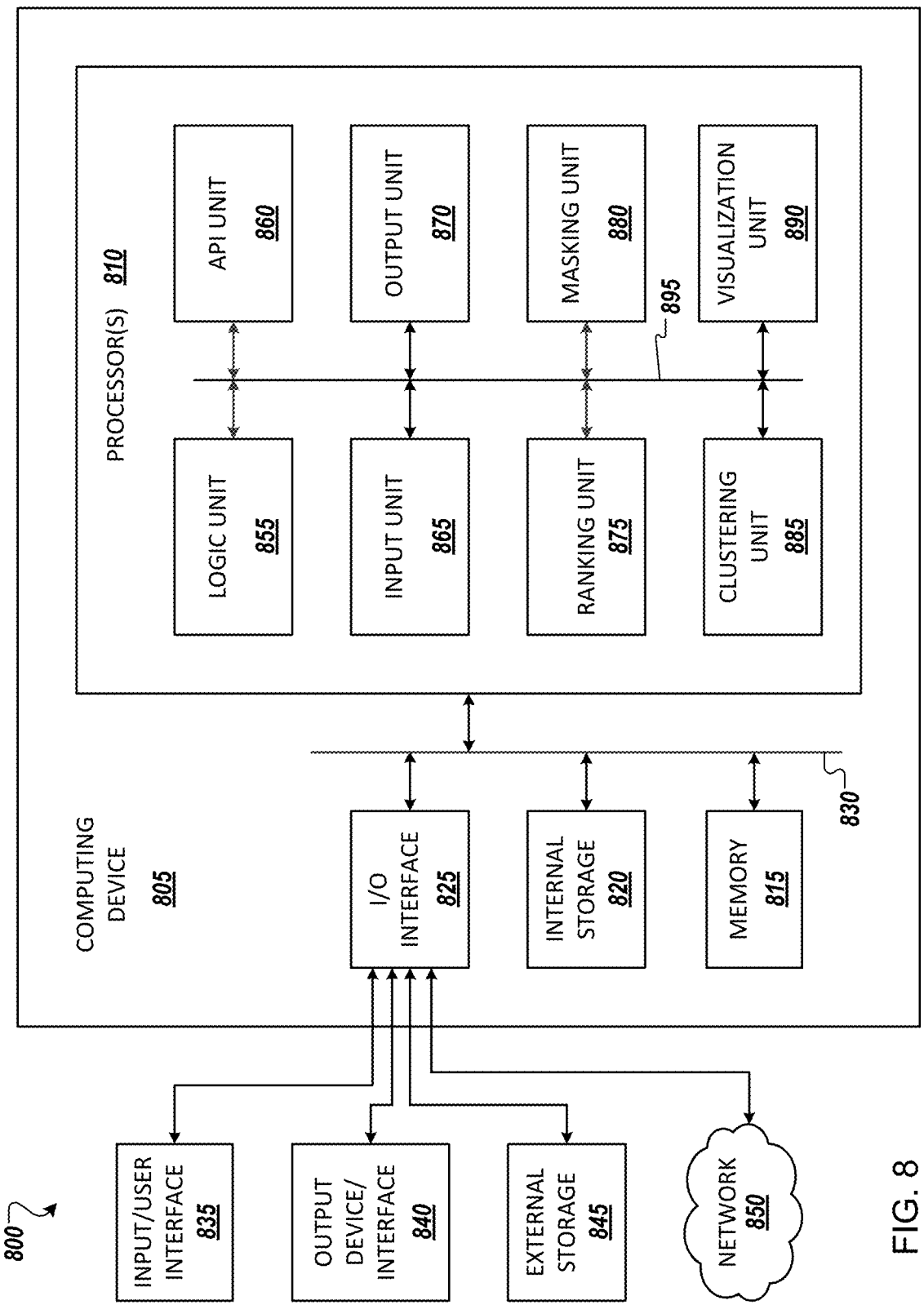
FIG. 8 illustrates, an example computing environment with an example computer device suitable for use in some example implementations of the present application.

FIG. 8 illustrates an example computing environment 800 with an example computer device 805 suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/interface 835 and output device/interface 840. Either one or both of input/interface 835 and output device/interface 840 can be a wired or wireless interface and can be detachable. Input/interface 835 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 840 may include a display, television, monitor, printer, speaker, braille, or the like. In some example implementations, input/interface 835 (e.g., user interface) and output device/interface 840 can be embedded with, or physically coupled to, the computing device 805. In other example implementations, other computing devices may function as, or provide the functions of, an input/interface 835 and output device/interface 840 for a computing device 805. These elements may include, but are not limited to, well-known AR hardware inputs so as to permit a user to interact with an AR environment.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 805 can be communicatively coupled (via I/O interface 825) to eternal storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, ranking unit 875, masking unit 880, clustering unit 885, and visualization unit 890 and inter-unit communication mechanism 895 for the different units to communicate with each other, with the OS, and with other applications (not shown).

For example, ranking unit 875, masking unit 880, clustering unit 885, and visualization unit 890 may implement one or more processes shown in FIGS. 1 and 7. The described units and elements can be varied in design, function, configuration, or implementation and are not limited to the descriptions provided.

In some example implementations, when information or an execution instruction is received by API unit 860, it may be communicated to one or more other units (e.g., ranking unit 875, masking unit 880, clustering unit 885, and visualization unit 890). For example, ranking unit 875 may rank data items received via the network or input unit to generate a portion of the ranked list. Further, the masking unit 880 may mask or hide part ranked list and the clustering unit 885 may iteratively cluster the unmasked portion of the ranked list. Further, visualization unit 890 may generate a visualization representative of the clustering of the ranked list and export the visualization via the output unit 870.

In some instances, the logic unit 855 may be configured to control the information flow among the units and direct the services provided by API unit 860, input unit 865, ranking unit 875, masking unit 880, clustering unit 885, and visualization unit 890 in some example implementations described above. For example, the flow of one or more processes or implementations may be controlled by logic unit 855 alone or in conjunction with API unit 860.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of visualizing data associated with a search query, the method comprising:
   receiving the search query over a network and executing the search query, by a computing device, over a database;
   receiving, by a computing device in response to the executing the search query, a data set of search results comprising a plurality of data items, each data item having rank information indicative of the relevance of the data item to the search query, and similarity information indicative of similarities between the data item and one or more other data items from the plurality of data items;

sorting, by the computing device, the data set of search results into a ranked list based on the rank information associated with each of the plurality of data items;

masking, by the computing device, a contiguous portion of the ranked list based on a boundary parameter having a value;

iteratively clustering, by the computing device, a portion of the ranked list other than the masked contiguous portion based on the similarity information associated with the plurality of data items to produce a clustered, ranked data list, wherein the iteratively clustering the portion of the ranked list other than the masked contiguous portion comprises, for each successive iteration:

changing the value of the boundary parameter by a step parameter;

unmasking a portion of the previously masked contiguous portion of the ranked list based on the changed value of the boundary parameter;

adding the unmasked portion to the portion of the ranked list other than the masked contiguous portion; and clustering the the added unmasked portion and the portion of the ranked list other than the masked contiguous portion; and generating and displaying a visualization of the iteratively clustered, ranked data list, the visualization comprising a shaped object representative of the data set of search results ordered based on each cluster in the iteratively clustered, ranked data list.

2. The method of claim 1, wherein one or more of the boundary parameter and the step parameter are user adjustable.

3. A method of visualizing data associated with a search query, the method comprising:

receiving the search query over a network and executing the search query, by a computing device, over a database;

receiving, by a computing device in response to the executing the search query, a data set of search results comprising a plurality of data items, each data item having associated rank information indicative of the relevance of the data item to the search query, and similarity information indicative of similarities between the data item and one or more other data items from the plurality of data items;

sorting, by the computing device, the data set of search results into a ranked list based on the rank information associated with each of the plurality of data items;

masking, by the computing device, a contiguous portion of the ranked list based on a boundary parameter having a value;

iteratively clustering, by the computing device, a portion of the ranked list other than the masked contiguous portion based on the similarity information associated with the plurality of data items to produce a clustered, ranked data list, wherein, for each successive interaction, changing the value of the boundary parameter by a step parameter;

generating and displaying a visualization of the clustered, ranked data list, the visualization comprising a shaped object representative of the data set of search results ordered based on each cluster in the clustered, ranked data list;

receiving a user instruction changing one or more values of the boundary parameter and the step parameter;

demasking the entire ranked list;

masking, by the computing device, a new contiguous portion of the ranked list;

iteratively clustering, by the computing device based on the changed one or more values, a new portion of the ranked list other than the masked new contiguous portion based on the similarity information associated with the plurality of data items to produce a clustered, ranked data list; and generating and displaying a new visualization representative of the clustered, ranked data list, the new visualization comprising a shaped object representative of each cluster in the clustered, ranked data list.

4. The method of claim 1, wherein the contiguous portion of the ranked list is defined to extend from a highest ranked data item to a lower ranked data item calculated based on the boundary parameter.

5. The method of claim 1, wherein the contiguous portion of the ranked list is defined to extend from a lowest ranked data item to a higher ranked data item calculated based on the boundary parameter.

6. The method of claim 1, wherein the generating the visualization comprising defining a size of each shaped object to be representative of a size of the cluster of the clustered, ranked data list associated with each shaped object; and defining a color of each shaped object to be representative of a highest ranked item in the cluster of the clustered, ranked data list associated with each shaped object.

7. A non-transitory computer readable medium encoded with instructions for making a computing device execute a method of visualizing data associated with a search query, the method comprising:

receiving the search query over a network and executing the search query, by a computing device, over a database;

receiving, by a computing device in response to the executing the search query, a data set of search results comprising a plurality of data items, each data item having rank information indicative of the relevance of the data item to the search query, and similarity information indicative of similarities between the data item and one or more other data items from the plurality of data items;

sorting, by the computing device, the data set of search results into a ranked list based on the rank information associated with each of the plurality of data items;

masking, by the computing device, a contiguous portion of the ranked list based on a boundary parameter having a value;

iteratively clustering, by the computing device, a portion of the ranked list other than the masked contiguous portion based on the similarity information associated with the plurality of data items to produce a clustered, ranked data list, wherein the iteratively clustering the portion of the ranked list other than the masked contiguous portion comprises, for each successive iteration:

changing the value of the boundary parameter by a step parameter;

unmasking a portion of the previously masked contiguous portion of the ranked list based on the changed value of the boundary parameter;

adding the unmasked portion to the portion of the ranked list other than the masked contiguous portion; and clustering the the added unmasked portion and the portion of the ranked list other than the masked contiguous portion; and generating and displaying a visualization of the iteratively clustered, ranked data list, the visualization comprising a shaped object representative of the data set of search results ordered based on each cluster in the iteratively clustered, ranked data list.

8. The non-transitory computer readable medium of claim 7, wherein one or more of the boundary parameter and the step parameter are user adjustable.

9. The non-transitory computer readable medium of claim 7, further comprising:

receiving a user instruction changing one or more values of the boundary parameter and the step parameter;

demasking the entire ranked list;

masking, by the computing device, a new contiguous portion of the ranked list;

iteratively clustering, by the computing device based on the changed one or more values, a new portion of the ranked list other than the masked new contiguous portion based on the similarity information associated with the plurality of data items to produce a clustered, ranked data list; and generating and displaying a new visualization representative of the clustered, ranked data list, the new visualization comprising a shaped object representative of each cluster in the clustered, ranked data list.

10. The non-transitory computer readable medium of claim 7, wherein the contiguous portion of the ranked list is defined to extend from a highest ranked data item to a lower ranked data item calculated based on the boundary parameter.

11. The non-transitory computer readable medium of claim 7, wherein the contiguous portion of the ranked list is defined to extend from a lowest ranked data item to a higher ranked data item calculated based on the boundary parameter.

12. The non-transitory computer readable medium of claim 7, wherein the generating the visualization comprising defining a size of each shaped object to be representative of a size of the cluster of the clustered, ranked data list associated with each shaped object; and defining a color of each shaped object to be representative of a highest ranked item in the cluster of the clustered, ranked data list associated with each shaped object.

13. A computing device comprising:

a memory storage device configured to store a database; and a processor communicatively coupled to the memory storage device, the processor configured to receive a search query and perform a method of visualizing data associated with the search query, the method comprising:

receiving the search query over a network and executing the search query, by a computing device, over a database;

receiving, by a computing device in response to the executing the search query, a data search results comprising a plurality of data items, each data item having rank information indicative of the relevance of the data item to the search query and similarity information indicative of similarities between the data item and one or more other data items from the plurality of data items;

sorting, by the computing device, the data set of search results into a ranked list based on the rank information associated with each of the plurality of data items;

masking, by the computing device, a contiguous portion of the ranked list based on a boundary parameter having a value;

iteratively clustering, by the computing device, a portion of the ranked list other than the masked contiguous portion based on the similarity information associated with the plurality of data items to produce a clustered, ranked data list, wherein the iteratively clustering the portion of the ranked list other than the masked contiguous portion comprises, for each successive iteration:

changing the value of the boundary parameter by a step parameter;

unmasking a portion of the previously masked contiguous portion of the ranked list based on the changed value of the boundary parameter;

adding the unmasked portion to the portion of the ranked list other than the masked contiguous portion; and clustering the the added unmasked portion and the portion of the ranked list other than the masked contiguous portion; and generating and displaying a visualization of the iteratively clustered, ranked data list, the visualization comprising a shaped object representative of the data set of search results ordered based on each cluster in the iteratively clustered, ranked data list.

14. The computing device of claim 13, wherein one or more of the boundary parameter and the step parameter are user adjustable; and further comprising:

receiving a user instruction changing one or more values of the boundary parameter and the step parameter;

demasking the entire ranked list;

masking, by the computing device, a new contiguous portion of the ranked list;

iteratively clustering, by the computing device based on the changed one or more values, a new portion of the ranked list other than the masked new contiguous portion based on the similarity information associated with the plurality of data items to produce a clustered, ranked data list; and generating and displaying a new visualization representative of the clustered, ranked data list, the new visualization comprising a shaped object representative of each cluster in the clustered, ranked data list.

15. The computing device of claim 13, wherein the contiguous portion of the ranked list is defined to extend from a highest ranked data item to a lower ranked data item calculated based on the boundary parameter.

16. The computing device of claim 13, wherein the contiguous portion of the ranked list is defined to extend from a lowest ranked data item to a higher ranked data item calculated based on the boundary parameter.

17. The computing device of claim 13, wherein the generating the visualization comprising defining a size of each shaped object to be representative of a size of the cluster of the clustered, ranked data list associated with each shaped object; and defining a color of each shaped object to be representative of a highest ranked item in the cluster of the clustered, ranked data list associated with each shaped object.

* * * * *